Figure 1:
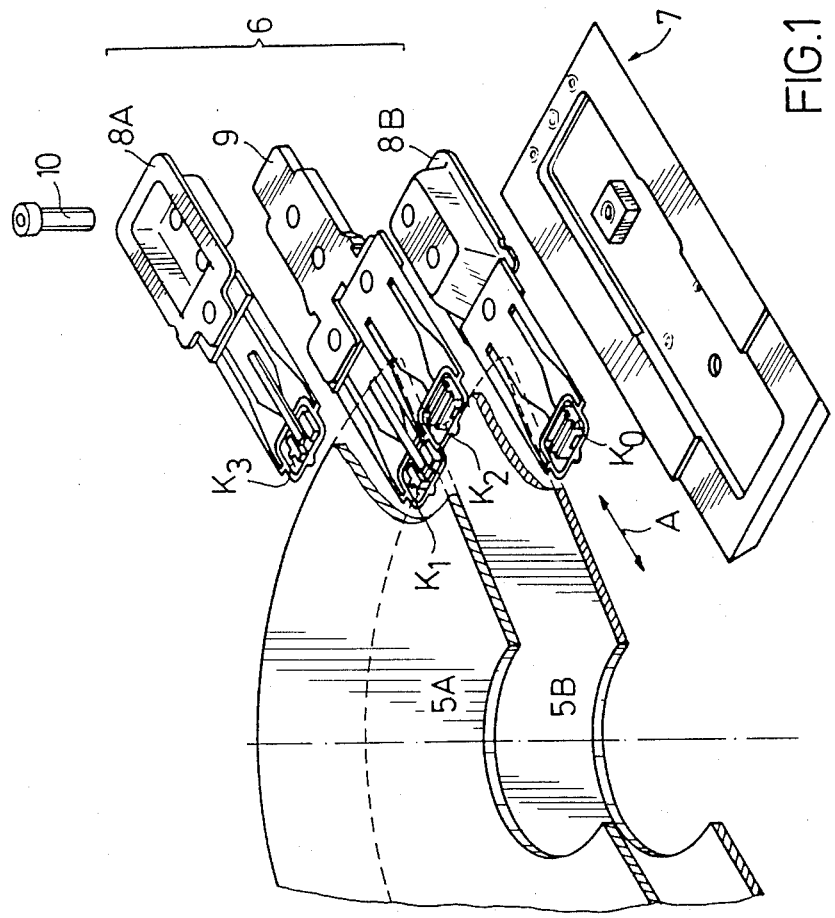

United States Patent [19]

Kohl et al.

[11] Patent Number: 4,720,756
[45] Date of Patent: Jan. 19, 1988

[54] APPARATUS FOR THE POSITIONING OF OBJECTS HAVING A LOW MASS AND A METHOD OF ASSEMBLY THEREOF

[75] Inventors: Lambert Kohl, Wachenheim; Bernd Roeger, Battenberg; Karlheinz Koenig, Ludwigshafen, all of Fed. Rep. of Germany

[73] Assignee: BASF Aktiengesellschaft, Ludwigshafen, Fed. Rep. of Germany

[21] Appl. No.: 794,455

[22] Filed: Nov. 4, 1985

[30] Foreign Application Priority Data

Nov. 7, 1984 [EP] European Pat. Off. ........ 84113401.8
Jun. 1, 1985 [DE] Fed. Rep. of Germany ... 8516071[U]

[51] Int. Cl.⁴ ............................................... G11B 5/55
[52] U.S. Cl. ...................................... 360/106; 360/109
[58] Field of Search ................... 360/106, 109, 97–99; 310/13

[56] References Cited

U.S. PATENT DOCUMENTS

| | | | |
|---|---|---|---|
| 3,521,092 | 7/1970 | Kalthoff | 310/13 |
| 4,393,425 | 7/1983 | Wright | 360/106 |
| 4,414,594 | 11/1983 | Farmer et al. | 360/106 |
| 4,418,370 | 11/1983 | Harrison | 360/106 |
| 4,427,905 | 1/1984 | Sutton | 360/106 |
| 4,462,054 | 7/1984 | Dong et al. | 360/106 |
| 4,475,136 | 10/1984 | Manzke et al. | 360/106 |
| 4,528,607 | 7/1985 | Thompson | 360/106 |

FOREIGN PATENT DOCUMENTS 8326795 9/1983 Fed. Rep. of Germany .

*Primary Examiner*—John H. Wolff
*Assistant Examiner*—Matthew J. Bussan
*Attorney, Agent, or Firm*—Keil & Weinkauf

[57] ABSTRACT

A positioning apparatus has a guidance system including first and second bearing means in which a pressure on one side of a guide plate and a height adjustment on its other side to be positioned are sufficient to provide an unambiguous controlled guidance virtually without deviation from the axis of movement of the guide plate. An advantageous construction is provided by a rotary bearing arrangement substantially in the form of an isosceles triangle. A particular mounting pivot point on the bearing support simplifies the assembly of an apparatus having a band drive means. The apparatus is suitable for all types of information recording and playback apparatuses employing disks or disk-shaped media, and also for positioning purposes in robots, etc.

20 Claims, 5 Drawing Figures

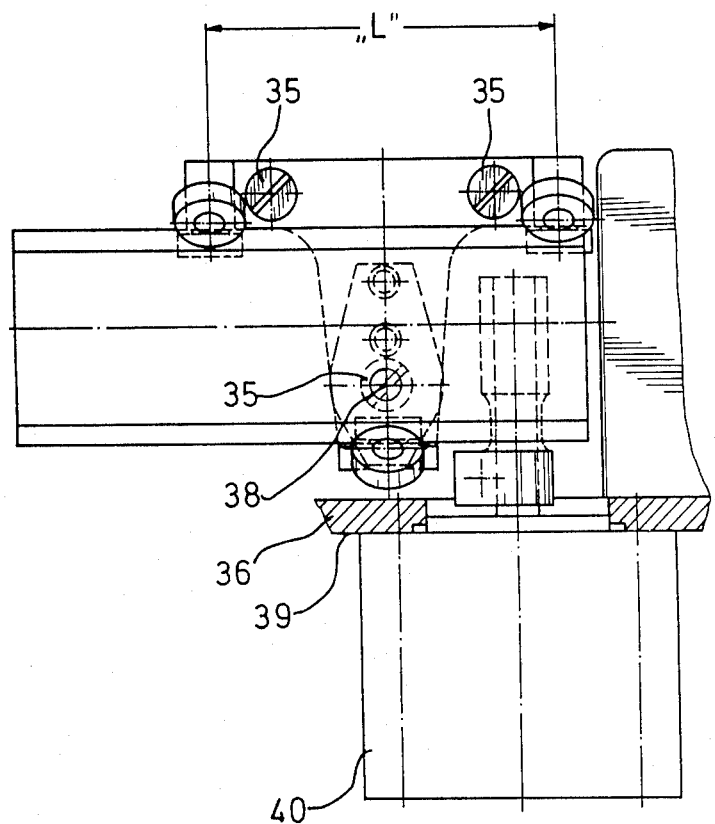

APPARATUS FOR THE POSITIONING OF OBJECTS HAVING A LOW MASS AND A METHOD OF ASSEMBLY THEREOF

The present invention relates to an apparatus for positioning objects having a low mass, in particular at least one magnetic head in a magnetic disk memory, comprising a chassis, a guide plate on which an object to be positioned is located and having opposite inclined longitudinal edge faces, bearing elements to support the guide plate on the chassis for movement relative to the chassis in the longitudinal direction of said longitudinal edges, the bearing elements comprising first bearing means and guide plate pressing second bearing means.

A positioning apparatus is known (West German Utility Model No. 82 15 555) in which two roller bearing pairs are disposed on separate stationary bearing supports and at least a third roller bearing pair disposed between them and gimbal-mounted on the chassis. While the inclined faces of the guide plate are supported on the first two stationary bearing pairs, the movable bearing pair located between them is intended to guarantee the height and the direction of the longitudinal movement of the guide plate. As a result of the fact that each pair of roller bearings is rigidly linked together, when the position of one of the bearings changes, that of the other bearing also changes. As a result of external effects a stable spatial guidance of the guide plate is therefore not guaranteed. The use in magnetic disk drives with one head each allocated to every disk side which are vertically disposed above and below each other is, however, possible since the lateral directional deviations do not play any significant part because all the heads are affected.

An improvement to the above apparatus is further known in which the foremost of the stationary bearing pairs was constructed to be laterally mobile within limits in order to eliminate existing manufacturing and adjustment tolerances.

A linear motor positioner is further known (U.S. Pat. No. 3,521,092) in which a mobile positioning carriage is in contact with three rollers arranged in a triangle on the flat upper side of a stationary guide plate, roller and two spring-mounted rollers are provided at the height of one of the said rollers on the inclined faces of the guide plate. Only by the use of a long solenoid can a dependable and reliably repeatable guidance, in particular for the positioning of magnetic heads on very narrow recording tracks with high recording density, be achieved.

It is an object of the present invention to provide, for scanning elements, a better positioning apparatus without the use of a linear motor, and an advantageous method for the assembly thereof, which are simple and dependable and cost-effective.

We have found that this object is achieved with a positioning apparatus of the type defined at the outset, wherein one of the said first and second bearing means is arranged to engage said opposite longitudinal edge faces of the guide plate, and comprises drive means for moving the guide plate in the bearing means, and the second bearing means comprises at least one stationary height adjustment element for the guide plate and a movable guide element resiliently urged against the guide plate by spring means, the at least one height adjustment element and the movable guide element exhibit low frictional contact with respect to the guide plate and substantially constant contact is established between the guide plate, the at least one height adjustment element and the rotary first bearing means by the resiliently urged movable guide element.

In this way a connection or link which is virtually free of play is achieved between the guide plate and the guide elements, which connection or link is also maintained if the front and rear rotary bearing pairs as the first bearing means are disposed at different height positions. As a result in every realizable plane, there results for the guide plate a surprisingly directionally stable longitudinal or transverse guidance which is applicable for all types of recording and playback equipment employing disks or disk-shaped recording media such as optical, capacitive, piezoelectric, magnetostrictive or magnetic disk memories.

The second bearing means for example consisting of one height adjustment element and a movable guide element each advantageously comprises a rotary bearing, in particular a commercial deep-groove ball bearing, so that the manufacture is very cheap. In a further advantageous embodiment the chassis comprises a common bearing support for mounting the first bearing means, the at least one height adjustment element and the movable guide elements.

If the at least one height adjustment element is adjustable in height with respect to the chassis and consequently to the other rotary bearings, the result is achieved that the height position of the guide plate is very precisely adjustable or that guide plate of different dimensions are usable in the same positioning apparatus without loss of precision in relation to the direction of movement.

For the purpose of a simple assembly of the apparatus, the rotary bearings and the at least one height adjustment element, as well as the movable guide element, are disposed on a common bearing support.

In a further embodiment the chassis comprises a frame means on which the bearing support is fixed by fixing means.

A favorable positioning apparatus is also obtained if two height adjustment elements are provided and the latter and the movable guide element, together with the first bearing means associated therewith, are arranged substantially in the form of an isosceles triangle and a fixing point of the fixing means is provided on the perpendicular line to a line joining the height adjustment elements. It is also advantageous if two further fixing points of the fixing means are provided between the height adjustment elements symmetrically about the said perpendicular line.

The at least one height adjustment element and the movable guide element are advantageously at least approximately opposite on a transverse axis of the guide plate, as a result of which the compressive force is transmitted by the shortest path to the said height adjustment element.

The at least one height adjustment element and the movable guide element are in each case disposed with practical benefit at least substantially midway between the first and second bearings of the first bearing means so that the direct and indirect compressive forces are distributed as uniformly as possible on the bearings.

In a special version of a positioning apparatus, when the drive element consists of a stepping motor with drive spindle and cylindrical member mounted thereon and a drive band which can be wound up is provided betwen said cylindrical member and guide plate, it is advantageous if the rear end of the bearing support viewed in the direction of the magnetic disk axis is constructed with an L-shaped cutout open on one side for receiving the cylindrical member and one of the rotary bearings is disposed on the extension of the bearing support which limits the cutout.

In this way a particularly space-saving and nevertheless fully functional positioning apparatus is provided which does not exhibit the serious disadvantage of the prior art that the cyclindrical member itself must act both as support and as guide element for the guide plate.

In this embodiment according to the invention it is favorable in terms of bearing if the rotary bearing pairs (first bearing means) located opposite each other are disposed in trapezoidal form, as a result of which the largest possible support base for the guide plate is achieved. The movable guide element of the second bearing means can in practice very advantageously be a rotary bearing mounted on a rectangular lever as its frame means, which bearing has a spring pin mounted on one side of the bearing support as spring element.

It is also an advantageous construction of the apparatus if the movable guide element is a rotary bearing mounted on a leaf spring as spring element, which bearing presses the guide plate onto the stationary rotary bearings and against one or more height adjustment elements.

In this way an effective pressure element can be realised which guarantees a prescribed spring force and which, in addition, can be rapidly and simply manufactured and assembled.

It is very advantageous in practice if the bearing support with the roller bearings, the height adjustment element and the movable guide element, preferably inclusive of the guide plate, is constructed as a unit which can be preassembled.

As a result of the said problem-free assembly outside the drive unit a conversion of existing drive units with the positioning apparatus is also possible, and obsolete or no longer functional positioners can readily be replaced rapidly by the advantageous apparatus according to the invention.

In a further advantageous embodiment of the positioning apparatus the bearing support is provided with adjustment holes for adjustment pins on the chassis and has a fixing hole for a single fixing screw.

As a result, after assembly of the apparatus, very simple mounting in the drive unit or equipment is possible with the required mounting accuracy being guaranteed.

The invention furthermore relates to a method for the assembly of a positioning apparatus according to the invention. In the method, first the bearing support is provided with the rotary bearings and the spring element and together with the guide plate, the cylindrical member and the steel band, is joined to the chassis as a preassembled separate unit by means of screws in a manner such that the apparatus as a preassembled unit is still rotatable about a point and that the stepping motor is then permanently joined to the chassis after inserting the stepping motor spindle into the cylindrical member, and that, before the screws are tightened up the preassembled unit is rotatable about said point in order to prevent stress effects in the steel band.

In total, with the apparatus according to the invention the following advantages result depending on the construction in accordance with the features of the claims, individually and in their combination of features:

(a) the guide function of the guide elements which is maintained even when the bearing support or supports are not in a horizontal plane (b) a free-running controlled guidance for the guide plate (c) the elimination of a variation in the position of the guide plate in its movement path once it has been adjusted as a result of the defined height adjustment of the guide plate on one side and the defined compressive force on the other side of the plate (d) an excellent directional stability of the apparatus which as a consequence is also usable for a multiplicity of scanning elements which are arranged adjacent to one another (e) a problem-free and economic manufacturability of the individual components without narrow tolerances (f) a simple complete preassembling and adjustment of the individual components to form a preassembled unit outside the drive unit, preferable inclusive of the guide plate (g) an easy and precise mounting of the preassembled unit in the drive unit.

Details of the invention are given in the following description and drawing of an exemplary embodiment of a positioning apparatus for magnetic fixed disk stores.

In the drawings

Figure 2:
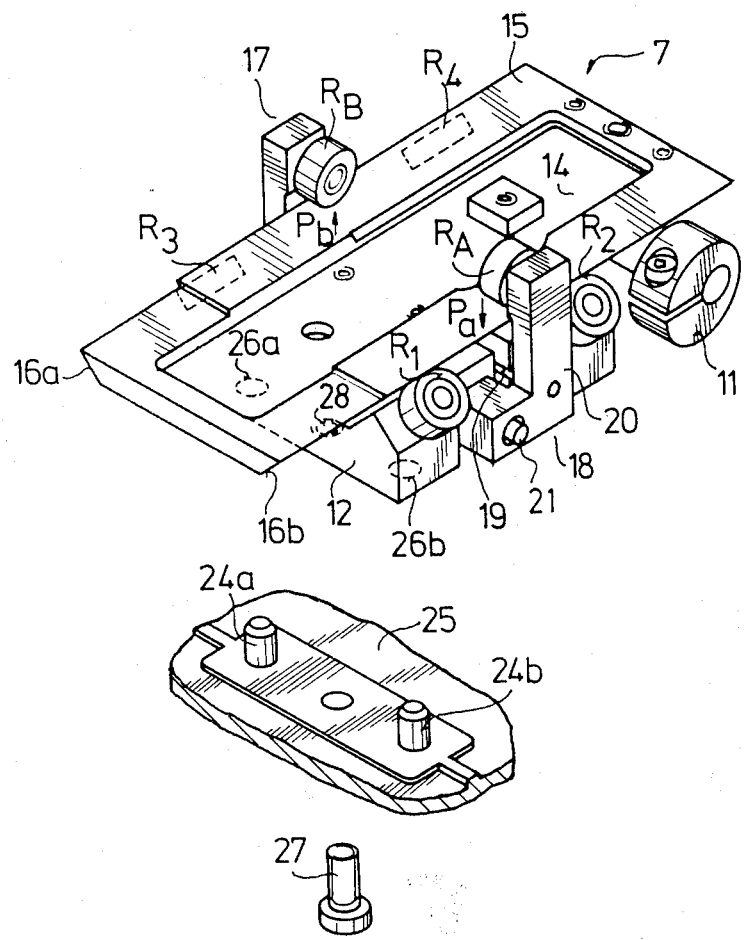
Figure 3:
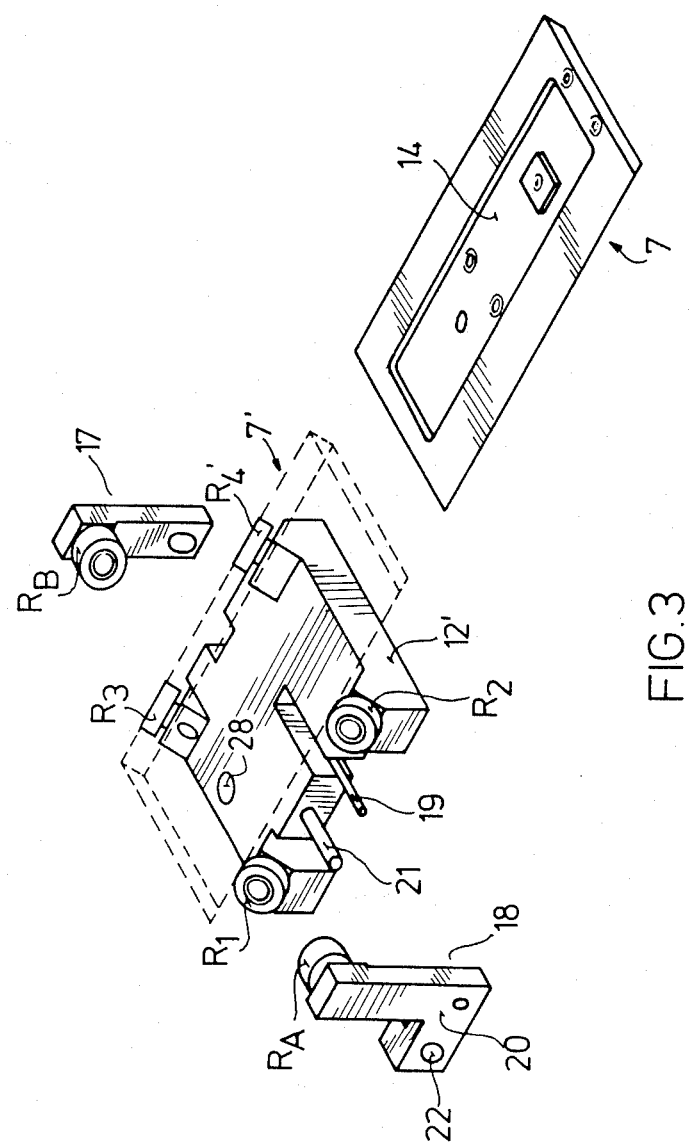
Figure 4:
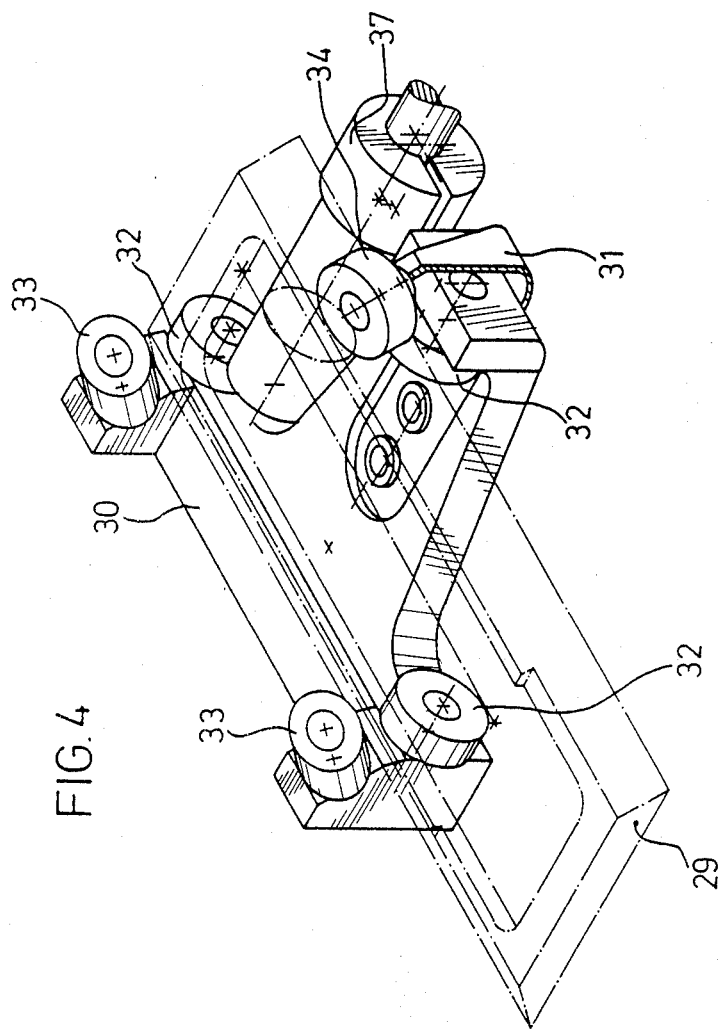

FIG. 1 shows a schematic magnetic disk memory with magnetic heads and their guide plate FIG. 2 shows the guide plate from FIG. 1 with first and second bearing means FIG. 3 shows the guide plate with first and second bearing menas depicted in their individual parts FIG. 4 shows a guide plate similar to that of FIG. 1 with first and second bearing means FIG. 5 shows the guide plate with first and second bearing means and drive motor and a cylindrical member with a steel band thereon as a preassembled unit.

Two concentric magnetic disks 5A and 5B are rotatable by means of a disk drive unit not shown and are movable by means of a head unit 6, essentially consisting of magnetic heads K0–K3, which are mounted on a guide plate 7, in relation to the magnetic tracks. The magnetic heads K0 and K3 are allocated to the underside of disk 5B or the upper side of disk 5A and are located vertically above each other. On the other hand, for reasons of space, the heads K1 and K2 are disposed at a distance next to each other and K1 is allocated to the upper side of the disk 5B and K2 to the underside of 5A. The head carriers are denoted by 8A, 8B and 9 and are mounted by means of a common screw 10 on the guide plate 7. The head unit 6 is slideable to and fro as shown by the double arrow A with respect to the disks by means of a drive element not shown such as, for example, a stepping motor which is suitably linked in an arbitrary manner to the guide plate 7 and whose movements are controlled.

In FIG. 2 the guide plate 7 with bearing and guide elements and a cylindrical member having a steel band wound thereon (bobbin wheel 11) is depicted as part of a drive element. Here one or two bearing supports 12 for stationary guide elements, and bearing rollers R1–R4, which are for example constructed as deep-groove ball bearings, are provided. The bobbin wheel 11 is, for example, linked via said steel band not shown on the underside of the guide plate 7 to the latter. Other drive possibilities are usable, only it should be ensured that the guide plate 7 never makes any contact with other guide elements than the described bearing rollers R1-R4 and the guide elements still to be described. The bobbin wheel 11 is therefore disposed at a distance from the guide plate 7 and the linking element is solely the flexible steel band acting as a drive belt not shown.

The guide plate 7 exhibits a flat recess 14 for receiving the head carrier 8b and has an upper flat peripheral edge face 15. On the underside flat edge faces 16a and 16b are provided disposed at an angle to the upper faces of the plate 7, in particular at 45° thereto. The bearing rollers R1-R4 are in contact with these edge faces 16a and 16b and are therefore also aligned at 45° to the planes of the bearing support or support or at a 90° angle to each other. To secure and align the guide plate 7, two further guide elements, a height adjustment element 17 and a pressure element 18 as a second bearing means are provided between the front bearing roller pair R1 and R3 and the back pair R2 and R4, in particular roughly in the center of the roller pairs. The height adjustment element 17 is a support part with a rotatable bearing roller RB and is advantageously mounted in a stationary manner with respect to the chassis, in particular directly mounted on the bearing support 12 and in particular adjustable in height, for example, by means of an elongated hole/screw mounting. The height adjustment element 17 has advantageously very low frictional resistance with respect to the guide plate 7 and therefore likewise embodies a bearing roller RB. This allows a predetermined distance to be adjusted with respect to the rollers R3 and R4 by means of the height of the element 17, which occurs only once, during the manufacture, or which is undertaken if the guide plate 7 is replaced by an equivalent one or a dimensionally different one. Between the bearing rollers R1 and R2 a movable, at any rate movable with respect to the guide plate 7, spring-mounted guide element 18 is provided as a pressing second bearing means for the guide plate 7. This movable guide element 18, like all the others, should exhibit a very low frictional resistance with respect to the guide plate 7 and is therefore likewise constructed with a bearing roller RA. The movable guide element 18, in the example consisting of a pivotable rectangular lever 20 with a rotatably mounted roller RA thereon, is mounted via a spring bearing on the bearing support 12 so that at least one compressive force component acts on the upper side of the guide plate 7. The spring bearing, a spring pin 19, is, for example, a steel pin which is easily insertable into a hole in a slot in the bearing support 12 and which constantly presses the bearing roller RA against the upper flat edge surface 15. The effective compressive force Pa can be selected in the range from approximately 20 to 100 pond, preferably in the range from 40 to 60 pond in the case of a positioner, for example, in a 5¼" fixed disk drive of the type "BASF 6188 Slim Line". That is about 1/50 to 1/10 of the compressive force which has to be used in the case of a positioner according to the above-cited prior art in order to achieve adequate contact of the heads with the disks and accuracy of the positioning of the heads located vertically above each other. 1 pond=0.00980665 Newton.

Generally the compressive force Pa in embodiments according to the present invention should be chosen in a manner such that a contact between the guide plate 7 and the guide elements (R1-R4, RA, RB) is assured, even if vibration tests in all directions have to be passed at all important frequency ranges up to approximately 1000 Hz.

The effective compressive force of the roller RA tilts the guide plate 7 about its central longitudinal axis into its prescribed position, in most cases parallel to the base plane of the bearing support or supports 12. The compressive force is deflected via the inclined edge surface 16a in the direction of the roller RB and the effective compressive force Pb effective at that point ensures the contact between the peripheral edge surface 15 of the guide plate 7 and the roller RB, further force components having a magnitude maintaining a constant contact between the rollers R1-R4. As a result of the chosen prism-like arrangement of the guide elements and the guide plate 7, reliable support and contact of the plate 7 are guaranteed. In addition, with a suitable choice of the bearing elements, for example, as deep-groove ball bearings a free controlled guidance is guaranteed for the plate 7 in its longitudinal direction. In practice, no deviation from the ideal direction of movement of the plate is measurable and the forward and reverse movement actions are completely matched. Surprisingly, the prescribed precision requirement of $\pm 1.5$ $\mu$m in the radial direction at room temperature is achieved with the apparatus according to the invention, as equally is the permissible lateral deviation in the case of the positioner according to West German Utility Model No. 82 15 555, which amounts to about $\pm 5$ $\mu$m but which in the case of the apparatus according to the invention does not, surprisingly, occur at all (see above).

In FIG. 3 the individual parts of the positioner are depicted individually before their assembly. Here 21 designates the pivoting axis for the rectangular lever and 22 the hole for this. The guide plate 7 is depicted once by dotted lines as 7' and once by solid lines.

In FIG. 2 adjustment pins 24a and 24b, which are disposed on the chassis 25, are provided to receive the apparatus as a preassembled unit. Adjustment holes 26a and 26b are provided at the front in the underside of the bearing support 12. A single fixing screw 27 serves for the simple and rapid mounting of the preassembled unit. In the bearing support 12 a fixing hole 28, in this case with thread, is provided. The roller bearings R1 to R4 are disposed in trapezoidal form in FIG. 2 in order to achieve as much guidance as possible in the longitudinal direction in the version with the steel band drive. The roller R4 is therefore at a greater distance from the roller R3 than the rollers R1 and R2 from each other. In FIG. 3 the roller R4' is, however, at the same distance from the roller R3.

FIG. 4 shows a further embodiment of the invention.

In FIG. 4 a guide plate 29 is shown with bearing and guide elements and a bobbin wheel 37 as part of a drive motor 40. Here a bearing support 30 for stationary guide elements, and bearing rollers 32, which are, for example, deep-groove ball bearings, are provided. The bobbin wheel 37 is, for example, linked via a steel band not shown on the underside of the guide plate 29 to the latter. Other drive arrangements are usable, only it should be ensured that the guide plate 29 never has any contact with guide elements other than the bearing rollers 32 described and the guide elements 33, 34 yet to be described. The bobbin wheel 37 is therefore also disposed at a distance from the guide plate 29 and the linking member is solely the flexible steel band acting as the drive belt not shown.

The guide plate 29 corresponds essentially to the plate 7 in FIG. 1 with the distinction that the inclined edge faces are directed upward instead of downward. The positioning apparatus in FIGS. 4 and 5 consists essentially of the three vertically disposed (here parallel to the chassis 36) rotary bearings 32 which are in contact with the horizontal underside of the plate 29. Above the vertical rotary bearings 32 there are provided, disposed at an angle and interacting with the upper inclined edge faces, guide elements 33 and 34 which are also constructed as rotary bearings and of which 33 serves as height adjustment element and 34 as guide or pressure element, the rotary bearing in the latter case being pressed in the direction of the inclined edge surface by means of a leaf spring 31. The spring-loaded movable guide element 34 therefore presses the plate 29 nonpositively against the height adjustment elements 33 which are at an angle and at the same time downward onto the vertically mounted rotary bearings 32. Here the planned triangular arrangement guarantees a three-point support of the guide plate 29 both in the horizontal and also in the planes inclined thereto, so that in the horizontal plane and also in the edge areas of the plate guidance and support are achieved which are maintained over the entire plate movement during the positioning action. In addition, the result is achieved that the force is uniformly distributed over all the rotary bearings, and therefore over the total range of movement of the plate since the force is exerted by means of the spring-loaded movable rotary bearing 34 as symmetrically as possible (centrally) in relation to the rotary bearing pairs 32, 33. The arrangement of the bobbin wheel 37, with which the steel band which is fixed on its other side to the guide plate 29, can be taken up and unwound, is in this case only determined by the dimension of the bearing support 30. If, as shown in FIGS. 4 and 5, a three-arm design is chosen for the latter, then there is adequate space for the bobbin wheel 37 to the right or left of the arm with the spring-loaded movable rotary bearing 34.

The bearing distance L of the bearing pairs 32, 33 should be chosen as large as possible, as also should the distance of the point 38 from the bearings 32, 33. In order to ensure that the positioning apparatus is mounted in a fixed manner and without distortion on the chassis 36, the bearing support 30 is joined to the chassis 36 at three fixing points. The bearing support 30 is rotatable about the fixing point 38 so that during assembly the position of the guide plate 29 is very precisely alignable with respect to the permanently positioned stepping motor 40 and the bobbin wheel 37. In this way deformation of the drive strip between bobbin wheel 37 and plate 29, which can occur as early as during assembly, is avoided from the start.

The assembly sequence of the complete positioning apparatus is described below:

The bearing support 30 is provided with rotary bearings 32, 33, 34 and spring metal sheet 31 and preassembled, inserted together with the guide plate 29, the bobbin wheel 37 and the steel strip not shown into the chassis 36 and joined to the chassis 36 with the screws 35. At this stage the screws 35 are not yet tightened up so that the preassembled unit is still rotatable about the point 38. The stepping motor 40 is then joined to the chassis 36 by means of the mounting face 39 and securely screwed in position. When stepping motor 40 and chassis 36 are brought together, the stepping motor shaft is slid into the bobbin wheel hole and securely linked to it by means of a clamping screw which is not visible. Since the preassembled unit of the positioner is rotatable about the point 38 it is alignable with the mounting face 39 and the drive strip is not deformed. After the alignment, the screws 35 are tightened up.

The positioning apparatuses described can be economically manufactured, can be simply and precisely assembled, and are dependable and precise in practical use in fixed magnetic disk drives with high recording density, for example approx. 30 M byte and over on $5\frac{1}{4}$ inch magnetic disks.

In the present invention by rotary bearing is meant a ball or roller bearing or friction bearing of any type. Deep-groove ball bearings have proved very successful in practice and are economical since they are manufactured in large quantities. In this sense the roller bearings are therefore, for example, deep-groove ball bearings. Depending on the application of the present invention, for example in the case of prolonged positioning times, it is, however, quite possible to construct the bearings R1 to R4, RA and RB or 32, 33, 34 as friction bearings. In this case at least the bearings R1 to R4 or 32 respectively should, however, always be constructed from bearings of the same type.

The nature of the controlled guidance of the guide plate or of another support part for scanning elements also makes it possible for this part to move in a plane other than the horizontal. For example, inclined positions or vertical positions are possible, the positioning accuracy likewise being guaranteed in the forward and return movement. Many other applications of the above positioning apparatus, for example in assembly robots, are therefore conceivable.

We claim:

1. Apparatus for positioning objects having a low mass, in particular at least one magnetic head in a magnetic disk memory, comprising
   a chassis,
   a guide plate on which an object to be positioned is located and having a pair of oppositely inclined longitudinal edge faces and also a pair of longitudinal edge faces which are parallel to the principal plane of the guide plate,
   bearing elements to support the guide plate on the chassis for movement relative to the chassis in the longitudinal direction of said edge faces, the bearing elements comprising first bearing means in the form of rotary bearings and guide plate pressing second bearing means, one of the said first and second bearing means being arranged to engage said oppositely inclined longitudinal edge faces of the guide plate, and the other being arranged to engage said edge faces of the guide plate which are parallel to the principal plane of the guide plate, and
   drive means for moving the guide plate in the bearing means,
   the second bearing means comprising at least one stationary height adjustment element for the guide plate and a guide element which is movable independently of said height adjustment element and spring means being provided for resiliently urging said movable element against the guide plate, the at least one height adjustment element and the movable guide element exhibiting low frictional contact with respect to the guide plate and substantially constant contact being established between the guide plate, the at least one height adjustment element and the first bearing means by the resiliently urged movable guide element.

2. A positioning apparatus as claimed in claim 1, wherein the height adjustment element or elements and the movable guide element each comprise a rotary bearing.

3. A positioning apparatus as claimed in claim 1, wherein the chassis comprises a common bearing support for mounting the first bearing means, the height adjustment element(s) and the movable guide element.

4. Apparatus as claimed in claim 3, wherein the chassis comprises fixing means and a frame means on which the bearing support is fixed by said fixing means.

5. Apparatus as claimed in claim 4, wherein two height adjustment elements are provided, the height adjustment elements and the movable guide element, together with the first bearing means associated therewith, being arranged substantially in the pattern of an isosceles triangle and a fixing point of the fixing means being provided on the perpendicular to a line joining the height adjustment elements.

6. Apparatus as claimed in claim 5, wherein two further fixing points of the fixing means are provided between the height adjustment elements symmetrically about the said perpendicular line.

7. Apparatus as claimed in claim 1, wherein the at least one height adjustment element are adjustable in height relative to the chassis.

8. Apparatus as claimed in claim 1, wherein the at least one height adjustment element and the movable guide element are disposed approximately opposite to each other in a plane normal to the principal plane of the guide plate.

9. Apparatus as claimed in claim 1, wherein the at least one height adjustment element and the movable guide element are disposed at least substantially midway between mutually opposite rotary bearings forming part of the first bearing means.

10. Apparatus as claimed in claim 9, wherein the movable guide element is a rotary bearing and mounted on a rectangular lever, and wherein said spring means is in the form of a spring pin mounted on one side of the bearing support.

11. Apparatus as claimed in claim 9, wherein the rotary bearing is mounted on a leaf spring so that the rotary bearing presses the guide plate onto the stationary rotary bearings of the first bearing means and against the at least one height adjustment element.

12. Apparatus as claimed in claim 9, wherein the bearing support with the stationary rotary bearings, the height adjustment element, the movable guide element and the guide plate is constructed as a preassembled unit.

13. Apparatus as claimed in claim 12, wherein the chassis has adjustment pins and a screw hole, wherein the bearing support has adjustment holes for receiving said adjustment pins and has a threaded hole, and wherein there is provided a fixing screw for adjustably mounting said bearing support, said screw extending through said screw hole in the chassis to said threaded hole in said bearing support.

14. Apparatus for positioning objects having a low mass, in particular at least one magnetic head in a magnetic disk memory, comprising,
a chassis,
a guide plate on which an object to be positioned is located and having a pair of oppositely inclined longitudinal edge faces and also a pair of longitudinal edge faces which are parallel to the principal plane of the guide plate,
bearing elements to support the guide plate on the chassis for movement relative to the chassis in the longitudinal direction of said edge faces, the bearing elements comprising first bearing means in the form of rotary bearings and guide plate pressing second bearing means, one of the said first and second bearing means being arranged to engage said oppositely inclined longitudinal edge faces of the guide plate, and the other being arranged to engage said edge faces of the guide plate which are parallel to the principal plane of the guide plate, and
drive means for moving the guide plate in the bearing means, said drive means consisting of a stepping motor with a drive spindle, a drive band connected between the chassis and the guide plate and a bobbin wheel driven by said drive spindle via said drive band,
the second bearing means comprising at least one stationary height adjustment element for the guide plate and a guide element which is movable independently of said height adjustment element, and spring means being provided for resiliently urging said movable element against the guide plate, the at least one height adjustment element and the movable guide element exhibiting low frictional contact with respect to the guide plate and substantially constant contact being established between the guide plate, the at least one height adjustment element and the first bearing means by the resiliently urged movable guide element, said first bearing means consisting of a bearing support and at least three rotary bearings which are stationary relative to the chassis, and said second bearing means consisting of at least one stationary rotary bearing as said height adjustment element and a movably arranged rotary bearing mounted by means of said spring means and exerting a constant compressive force on the guide plate to maintain contact thereof with the height adjustment element.

15. Apparatus as claimed in claim 14, wherein the first bearing means consists of two rotary bearing pairs which are located opposite each other and which are arranged in trapezoidal form.

16. Apparatus as claimed in claim 15, wherein in the second bearing means one rotary bearing serves as a height adjustment element and another rotary bearing arranged substantially opposite the said one rotary bearing and urged by said spring means against said guide plate forms the movable guide element.

17. Apparatus as claimed in claim 14, wherein the first bearing means consists of three rotary bearings which are arranged in the pattern of an isosceles triangle.

18. Apparatus as claimed in claim 17, wherein said first bearing means includes three rotary bearings and said second bearing means includes a movable guide element opposite one of said three rotary bearings and two height adjustment elements opposite the other two of said three rotary bearings, respectively, wherein the three bearings and the three opposite elements are arranged substantially in the pattern of an isosceles triangle, and wherein a support common to said rotary bearings and said elements is provided with a pivot point which lies on a line perpendicular to a line joining the two rotary bearings.

19. Apparatus as claimed in claim 14, wherein the at least three rotary bearings, the at least one height adjustment element and the movable guide element are mounted on common T-shaped bearing support, and wherein under one arm of the T-shaped bearing support there is provided an L-shaped cutout open on one side for receiving the bobbin wheel and one of the rotary bearings of the first bearing means is disposed on the arm of the T-shaped bearing support adjacent to said cutout.

20. A method for assembling an apparatus for positioning objects of low mass, in particular at least one magnetic head in a magnetic disk memory, said apparatus including a chassis, a guide plate on which an object to be positioned is located and having a pair of oppositely inclined longitudinal edge faces and also a pair of longitudinal edge faces which are parallel to the principal plane of the guide plate, bearing elements to support the guide plate on the chassis for movement relative to the chassis in the longitudinal direction of said edge faces, the bearing elements comprising first bearing means in the form of stationary rotary bearings and guide plate pressing second bearing means, one of the said first and second bearing means being arranged to engage said oppositely inclined longitudinal edge faces of the guide plate, and the other being arranged to engage said edge faces of the guide plate which are parallel to the principal plane of the guide plate, and drive means for moving the guide plate in the bearing means, said drive means consisting of a stepping motor with a drive spindle, a drive band connected between the chassis and the guide plate and a bobbin wheel driven by said drive spindle via said drive band, the second bearing means comprising at least one stationary height adjustment element for the guide plate and a guide element which is movable independently of said height adjustment element, and spring means being provided for resiliently urging said movable element against the guide plate, the at least one height adjustment element and the movable guide element exhibiting low frictional contact with respect to the guide plate and substantially constant contact being established between the guide plate, the at least one height adjustment element and the first bearing means by the resiliently urged movable guide element, there being provided a common bearing support for mounting the first bearing means, the height adjustment element(s) and the movable guide element, said first bearing means consisting of at least three rotary bearings which are stationary relative to the chassis, and said second bearing means consisting of at least one stationary rotary bearing as said height adjustment element and a movably arranged rotary bearing mounted by means of said spring means and exerting a constant compressive force on the guide plate to maintain contact thereof with the height adjustment element;

said method comprising the steps of:

mounting the stationary rotary bearing and the spring means on said stationary support, joining the common support and the stationary rotary bearings thereon, together with the guide plate, the bobbin wheel and the drive belt, to the chassis as a preassembled unit in a manner such that the preassembled unit is still rotatable about a pivot point, inserting the drive spindle into the bobbin wheel, joining the stepping motor to the chassis, rotatably adjusting the preassembled unit about said pivot point in order to eliminate stress in the drive belt, and then tightening the screws.

* * * * *